US012423826B2

(12) United States Patent
Yoon et al.

(10) Patent No.: US 12,423,826 B2
(45) Date of Patent: Sep. 23, 2025

(54) 3D SEMANTIC SEGMENTATION METHOD AND COMPUTER PROGRAM RECORDED ON RECORDING MEDIUM TO EXECUTE THE SAME

(71) Applicant: INFINIQ CO., LTD., Seoul (KR)

(72) Inventors: Jae Geun Yoon, Seoul (KR); Seung Jin Oh, Seongnam-si (KR); Kwang Ho Song, Seoul (KR); Jiyeon Jeon, Incheon (KR)

(73) Assignee: INFINIQ CO., LTD., Seoul (KR)

( * ) Notice: Subject to any disclaimer, the term of this patent is extended or adjusted under 35 U.S.C. 154(b) by 0 days.

(21) Appl. No.: 18/732,924

(22) Filed: Jun. 4, 2024

(65) Prior Publication Data
US 2025/0014187 A1  Jan. 9, 2025

(30) Foreign Application Priority Data
Jul. 4, 2023 (KR) .................. 10-2023-0086542

(51) Int. Cl.
| | |
|---|---|
| *G01S 17/89* | (2020.01) |
| *G06T 5/30* | (2006.01) |
| *G06T 7/11* | (2017.01) |
| *G06T 7/12* | (2017.01) |
| *G06T 7/174* | (2017.01) |

(Continued)

(52) U.S. Cl.
CPC .............. *G06T 7/12* (2017.01); *G01S 17/89* (2013.01); *G06T 5/30* (2013.01); *G06T 7/11* (2017.01);
(Continued)

(58) Field of Classification Search
CPC ..... G06T 7/10; G06T 7/11; G06T 7/12; G06T 2200/04; G06T 2207/10024;
(Continued)

(56) References Cited

U.S. PATENT DOCUMENTS

| | | | | |
|---|---|---|---|---|
| 2021/0201145 A1* | 7/2021 | Pham | ..................... | G06V 20/56 |
| 2023/0081913 A1* | 3/2023 | Tsai | ..................... | G06V 10/811 |
| | | | | 382/159 |
| 2023/0267615 A1* | 8/2023 | Agia | ..................... | G01S 17/42 |
| | | | | 345/419 |

FOREIGN PATENT DOCUMENTS

| | | |
|---|---|---|
| KR | 10-2073873 B1 | 2/2020 |
| KR | 10-2021-0036244 A | 4/2021 |

OTHER PUBLICATIONS

He et al., "Multimodal Fusion and Data Augmentation for 3D Semantic Segmentation", Dec. 1, 2022, ICROS, the 22nd International Conference on Control, Automation and Systems (ICCAS 2022), p. 1143-1148. (Year: 2022).*

(Continued)

*Primary Examiner* — Vincent Rudolph
*Assistant Examiner* — Timothy Choi
(74) *Attorney, Agent, or Firm* — Bridgeway IP Law Group, PLLC; Jihun Kim

(57) ABSTRACT

3D semantic segmentation methods and devices for performing 3D semantic segmentation on the basis of fusion data obtained through sensor fusion of cameras and LiDAR are described. According to one embodiment, a method comprises receiving an image photographed by a camera and point cloud data acquired from a LiDAR, by a learning data generation device, generating a projection image expressing the point cloud data in polar coordinates of a size equal to those of the image, by the learning data generation device, and inputting the image and the projection image into an artificial intelligence (AI) machine learned in advance to estimate a 2D segment map and a 3D segment map having dimensions as high as a number of types of classes to be predicted, by the learning data generation device.

5 Claims, 9 Drawing Sheets

(51) Int. Cl.
*G06V 10/771* (2022.01)
*G06V 10/82* (2022.01)
(52) U.S. Cl.
CPC ............ *G06V 10/771* (2022.01); *G06V 10/82* (2022.01); *G06T 7/174* (2017.01); *G06T 2207/10028* (2013.01); *G06T 2207/20081* (2013.01); *G06T 2207/20084* (2013.01); *G06T 2207/30261* (2013.01)
(58) Field of Classification Search
CPC ........... G06T 2207/10028; G06T 2207/20084; G06T 2207/30236; G06T 2207/30252; G06T 5/30; G01S 17/89; G06V 10/82; G06V 20/56; G06V 20/70; G06V 10/771
See application file for complete search history.

(56) References Cited

OTHER PUBLICATIONS

Zhao et al., "LIF-Seg: LiDAR and Camera Image Fusion for 3D LiDAR Semantic Segmentation", May 17, 2023, IEEE, IEEE Transactions on Multimedia, vol. 26, p. 1158-1168. (Year: 2023).*

Alnaggar et al., "Multi Projection Fusion for Real-time Semantic Segmentation of 3D LiDAR Point Clouds", Jan. 2021, IEEE, 2021 IEEE Winter Conference on Applications of Computer Vision (WACV), p. 1799-1808. (Year: 2021).*

Aksoy et al. "SalsaNet: Fast Road and Vehicle Segmentation in LiDAR Point Clouds for Autonomous Driving", Oct. 23, 2020, IEEE, 2020 IEEE Intelligent Vehicles Symposium (IV), p. 926-932. (Year: 2020).*

Zhuang et al., "Perception-Aware Multi-Sensor Fusion for 3D LiDAR Semantic Segmentation", Oct. 2021, IEEE, 2021 IEEE/CVF International Conference on Computer Vision (ICCV), p. 16260-16270. (Year: 2021).*

Candan et al., "U-Net-based RGB and LiDAR image fusion for road segmentation", Jan. 2023, Springer, Signal, Image and Video Processing (2023), vol. 17, p. 2837-2843. (Year: 2023).*

El-Madawi et al., "RGB and LiDAR fusion based 3D Semantic Segmentation for Autonomous Driving", Oct. 2019, IEEE, 2019 IEEE Intelligent Transportation Systems Conference (ITSC), p. 7-12. (Year: 2019).*

Jaegeun Yoon et al., "TwinAMFNet : Twin Attention-based Multimodal Fusion Network for 3D Semantic Segmentation", Journal of KIISE, Sep. 2023, pp. 784-794, vol. 50, No. 9, doi: 10.5626/JOK.2023.50.9.784.

* cited by examiner

3D SEMANTIC SEGMENTATION METHOD AND COMPUTER PROGRAM RECORDED ON RECORDING MEDIUM TO EXECUTE THE SAME

CROSS-REFERENCE TO RELATED APPLICATIONS

This application claims the priority of Korean Patent Application No. 10-2023-0086542 filed on Jul. 4, 2023, in the Korean Intellectual Property Office, the disclosure of which is incorporated herein by reference.

STATEMENT REGARDING PRIOR DISCLOSURES BY THE INVENTORS

The inventors of the present application are the authors of the article, "TwinAMFNet: Twin Attention-based Multimodal Fusion Network for 3D Semantic Segmentation" published on September 2023, one year or less before the effective filing date of the present application, which is not prior art under 35 U.S.C. 102(b)(1)(A).

BACKGROUND OF THE INVENTION

Field of the Invention

The present invention relates to processing of artificial intelligence (AI) learning data. More specifically, the present invention relates to a 3D semantic segmentation method for performing 3D semantic segmentation on the basis of fusion data obtained through sensor fusion of cameras and LiDAR, and a computer program recorded on a recording medium to execute the same.

Background of the Related Art

Artificial intelligence (AI) means a technique that artificially implements some or all of learning ability, inference ability, and perception ability of a human being using computer programs. In relation to the artificial intelligence (AI), machine learning means learning that optimizes parameters on the basis of given data using a model configured of a plurality of parameters. The machine learning like this is divided into supervised learning, unsupervised learning, and reinforcement learning according to the type of learning data.

Generally, design of artificial intelligence (AI) learning data progresses through the stages including design of data structure, collection of data, refinement of data, processing of data, dilation of data, and verification of data.

Describing each of the stages in more detail, design of data structure is accomplished through definition of ontology, design of classification system, and the like. Collection of data is accomplished by collecting data through direct photographing, web crawling, associations/professional organizations, or the like. Refinement of data is accomplished by removing duplicate data from the collected data and de-identifying personal information or the like. Processing of data is accomplished by performing annotation and inputting metadata. Dilation of data is accomplished by performing ontology mapping and supplementing or dilating ontology as needed. In addition, verification of data is accomplished by verifying validity according to a target quality that is set using various verification tools.

Meanwhile, automatic driving of a vehicle means a system that allows the vehicle to make its own decision to drive. The automatic driving like this may be divided into progressive stages from non-automation to full automation according to a degree involved in driving by the system and a degree of controlling the vehicle by a driver. Generally, the stages of automatic driving are classified by Society of Automotive Engineers (SAE) International into six levels. According to the six levels classified by the SAE International, level 0 is non-automation, level 1 is driver assistance, level 2 is partial automation, level 3 is conditional automation, level 4 is high automation, and level 5 is full automation.

The automatic driving of a vehicle is performed through a mechanism of perception, localization, path planning, and control. Currently, several companies are under development to implement the perception and the path planning among the automatic driving mechanism using artificial intelligence (AI).

However, as collision accidents of automatic driving vehicles frequently occur recently, demands for improving safety of automatic driving are increasing.

Meanwhile, semantic segmentation is an important perception technique that allows automatic driving vehicles to recognize a wide range of surrounding environment by dividing the environment for each object. In particular, 3D semantic segmentation allows to perceive the surrounding environment three-dimensionally like reality.

Recently, techniques for identifying objects included in point cloud data acquired from LiDAR have been developed on the basis of remarkable advancement in computer vision techniques and deep learning techniques.

However, due to the nature of sparsity of the point cloud data acquired from LiDAR, i.e., as no data exists between points, there is a problem in that it is difficult to accurately distinguish boundaries between objects when the distance is too short or larger than a predetermined distance.

In addition, since the point cloud data does not include color information, there is a problem in that elements such as colors of traffic lights, markings on signboards, and the like that should be essentially recognized while driving cannot be recognized.

(Patent Document 1) Korean Patent Publication No. 10-2073873, 'Semantic segmentation method and device thereof', (registered on Jan. 30, 2020)

SUMMARY OF THE INVENTION

An object of the present invention is to provide a 3D semantic segmentation method for performing 3D semantic segmentation on the basis of fusion data obtained through sensor fusion of cameras and LiDAR.

Another object of the present invention is to provide a computer program recorded on a recording medium to execute a 3D semantic segmentation method for performing 3D semantic segmentation on the basis of fusion data obtained through sensor fusion of cameras and LiDAR.

Technical problems of the present invention are not limited to the technical problems mentioned above, and unmentioned other technical problems will be clearly understood by those skilled in the art from the following description.

To accomplish the above objects, the present invention proposes a 3D semantic segmentation method for performing 3D semantic segmentation on the basis of fusion data obtained through sensor fusion of cameras and LiDAR. The method may include the steps of: receiving an image photographed by a camera and point cloud data acquired from LiDAR, by a learning data generation device; generating a projection image expressing the point cloud data in polar coordinates of a size the same as those of the image, by the learning data generation device; and inputting the image and the projection image into an artificial intelligence (AI) machine-learned in advance to estimate a 2D segment map and a 3D segment map having dimensions as high as the number of types of classes to be predicted, by the learning data generation device.

Specifically, the generating step includes the step of generating the projection image through a multiplication operation of calibration matrix information between the LiDAR and the camera and coordinates of the point cloud data, and generating an image and a projection image having the same height and width by truncating a preset area from the generated projection image, and equally truncating the truncated area from the image.

The 3D semantic segmentation method further comprises, before the estimating step, the step of learning the artificial intelligence.

The learning step includes the step of learning the artificial intelligence on the basis of a synthesis loss function that simultaneously calculates and sums loss values for estimating the 2D segment map and the 3D segment map.

The synthesis loss function is expressed as shown in the following equation.

$$L_{total} = L_{3D}(pred_{3D}, label_{3D}) + L_{2D}(pred_{2D}, label_{2D}) \quad \text{[Equation]}$$

(Here, $L_{2D}$ denotes a first loss value for estimating the 2D segment map, $L_{3D}$ denotes a second loss value for estimating the 3D segment map, $label_{2D}$ denotes a first correct answer value for estimating a 2D segment map, and $label_{3D}$ denotes a second correct answer value for estimating a 3D segment map.)

The learning step includes the step of setting pixels neighboring as much as a preset distance from each point included in the first correct answer value with the same label.

The first loss value and the second loss value are calculated through the following equation.

$$L_{2D} = L_{Focal}(pred_{2D}, label_{2D}) + L_{Dice}(pred_{2D}, label_{2D}) \quad \text{[Equation]}$$
$$L_{3D} = L_{Focal}(pred_{3D}, label_{3D}) + L_{Lovasz}(pred_{3D}, label_{3D})$$

(Here, $label_{2D}$ denotes the first correct answer value, and $label_{3D}$ denotes the second correct answer value.)

The Focal Loss ($L_{Focal}$) is calculated through the following equation.

$$L_{Focal} = -P_{true} * (1 - P_{pred})^2 \log(P_{pred}) \quad \text{[Equation]}$$

The Dice Loss ($L_{Dice}$) is calculated through the following equation.

$$L_{Dice} = 1 - \frac{2\sum(P_{true} * P_{pred})}{\sum P_{true}^2 + \sum P_{pred}^2 + \epsilon} \quad \text{[Equation]}$$

The Lovasz Loss ($L_{Lovasz}$) is calculated through the following equation.

$$L_{Lovasz} = \frac{1}{|C|}\sum_{c \in C} \overline{\Delta_{J_c}}(m(c)) \quad \text{[Equation]}$$

The $\Delta_{j_c}$ is calculated through the following equation.

$$\Delta_{j_c}(P_{true}, P_{pred}) = 1 - j_c(P_{true}, P_{label})$$

The $J_c(P_{true}, P_{pred})$ is calculated through the following equation.

$$j_c(P_{true}, P_{pred}) = \frac{|P_{true} = c \cap P_{pred} = c|}{|P_{true} = c \cup P_{pred} = c|}$$

The $m_i(c)$ is calculated through the following equation.

$$m_i(c) = \begin{cases} 1 - f_i(c) & \text{if } c = y_i^* \\ f_i(c) & \text{otherwise} \end{cases}$$

The $f_i(c)$ is calculated through the following equation.

$$f_i(c) = \frac{c^{F_i(c)}}{\sum_{c' \in C} c^{F_i(c)}(c')} \forall i \in [1, p],$$
$$\forall_c \in C$$

(Here, $P_{pred}$ denotes the 2D segment map or the 3D segment map, $P_{true}$ denotes the first correct value or the second correct value, and C denotes the entire class, and c denotes each class.)

The artificial intelligence includes: an encoder including a contextual block and a residual block (res block) for learning a structure and context information of the image and the projection image; a decoder including a dilation block (up block) for dilating data output from the encoder, and an output layer for outputting the 2D segment map and the 3D segment map; and an attention fusion module including an attention fusion block for fusing feature maps output from the contextual block, the residual block, and the dilation block.

The encoder sequentially generates feature maps of ½, ¼, ⅛, and 1/16 times of the size of the image and the projection image, and transfers the feature maps to the dilation block of the decoder, the decoder sequentially restores the feature maps received from the encoder in sizes of ⅛, ¼, ½, and 1, and the dilation block includes a pixel shuffle layer for dilating or reducing the received feature maps, a dilated convolution layer for learning features of dilated feature maps, and a concatenation layer for concatenating the dilated feature maps with the feature map transferred from the residual block of the encoder through a residual connection.

The attention fusion block is arranged between a plurality of residual blocks and a plurality of dilation blocks, excluding the contextual block, to infer features of the projection image having a relatively insufficient amount of information about shapes, structures, and boundaries of objects on the basis of features of an image having color information.

The step of estimating the segment maps includes the steps of generating a 2D segment map and a 3D segment map with emphasized important features by inferring locations and reflection rates of the important features from the feature maps of the image through artificial intelligence, multiplying the inferred locations and reflection rates with the feature map of the image and the feature map of the projection image, and connecting the feature maps to the image and the projection image through the residual block.

The step of estimating the segment maps includes the steps of deriving a channel including important features among the channels of the generated 3D segment map, calculating importance of the derived channel, and connecting the channel through a residual path.

In order to solve the technical problems described above, the present invention proposes a computer program recorded on a recording medium to execute a 3D semantic segmentation method. The computer program may be combined with a computing device configured to include a memory, a transceiver, and a processor for processing instructions loaded on the memory. In addition, the computer program may be a computer program recorded on a recording medium to execute the steps of receiving an image photographed by a camera and point cloud data acquired from LiDAR, by the processor; generating a projection image expressing the point cloud data in polar coordinates of a size the same as those of the image, by the processor; and inputting the image and the projection image into an artificial intelligence (AI) machine-learned in advance to estimate a 2D segment map and a 3D segment map having dimensions as high as the number of types of classes to be predicted, by the processor.

Specific details of other embodiments are included in the detailed description and drawings.

According to the embodiments of the present invention, the advantages of image and point cloud data can be utilized through the artificial intelligence configured of dual input and dual output, and important visual information about objects and boundaries included in the images may be smoothly fused and utilized together with location and distance information of objects included in the point cloud data.

The effects of the present invention are not limited to the effects mentioned above, and unmentioned other effects can be clearly understood by those skilled in the art from the description of the claims.

DETAILED DESCRIPTION OF THE PREFERRED EMBODIMENT

Figure 1:
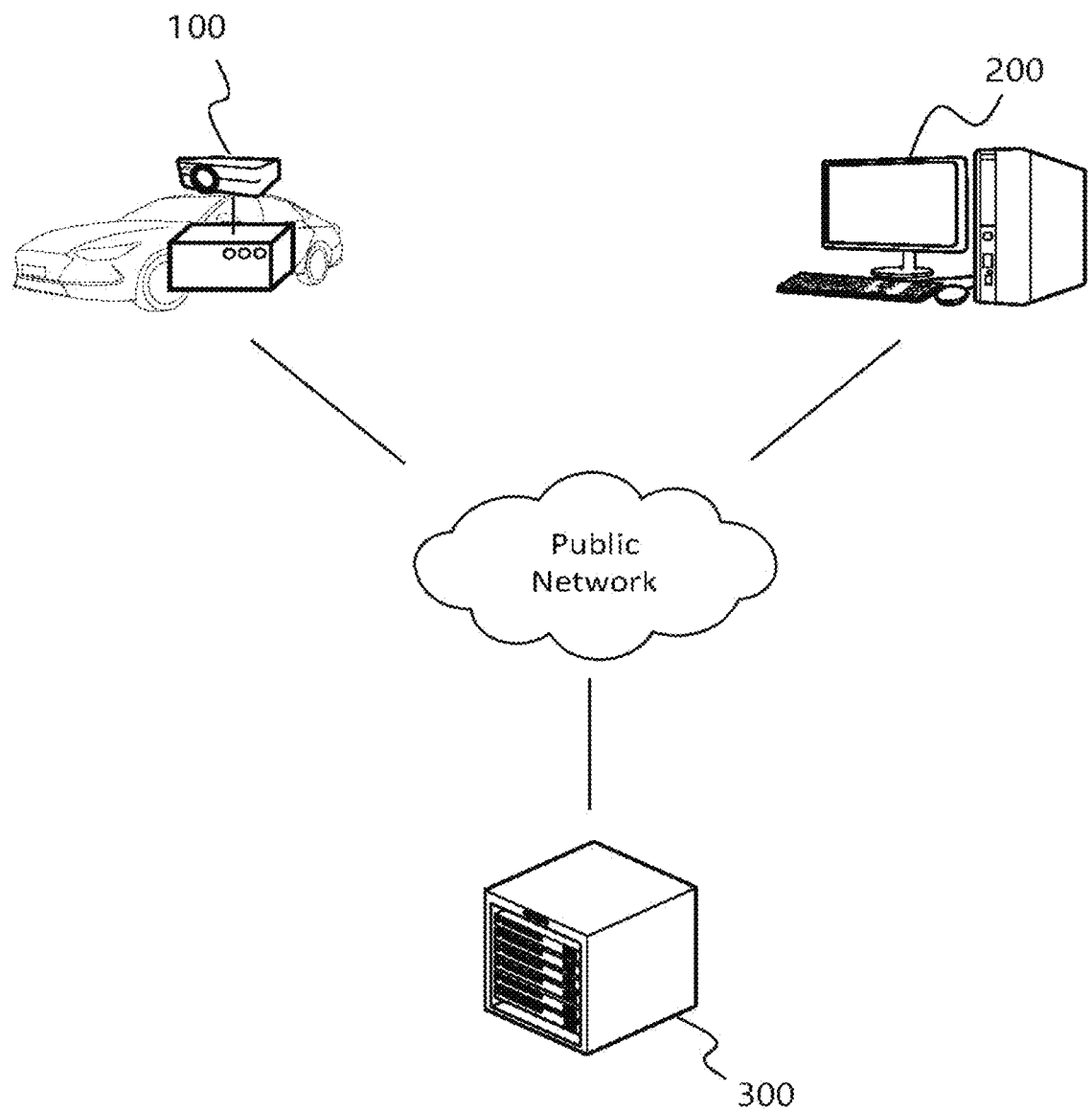
FIG. 1 is a configuration view showing an artificial intelligence learning system according to an embodiment of the present invention.

It should be noted that the technical terms used in this specification are only used to describe specific embodiments and are not intended to limit the present invention. In addition, the technical terms used in this specification should be interpreted as a meaning commonly understood by those of skilled in the art, unless specifically defined otherwise in this specification, and should not be interpreted in an excessively inclusive or reduced meaning. In addition, when the technical terms used in this specification are incorrect technical terms that do not accurately express the spirit of the present invention, they should be replaced with technical terms that those skilled in the art can correctly understand. In addition, general terms used in the present invention should be interpreted as defined in a dictionary or according to the context, and should not be interpreted in an excessively reduced meaning.

In addition, singular expressions used in this specification include plural expressions unless the context clearly indicates otherwise. In this application, terms such as 'configured of' or 'having' should not be interpreted as necessarily including all of the various components or steps described in the specification, and should be interpreted as including some of the components or steps among them, or further including additional components or steps.

In addition, although the terms including ordinal numbers such as first, second, and the like used in this specification may be used to describe various components, the components should not be limited by the terms. The terms are used only for the purpose of distinguishing one component from another. For example, a first component may be named as a second component without departing from the scope of the present invention, and similarly, a second component may also be named as a first component.

When a component is referred to as being "connected" or "coupled" to another component, although it may be directly connected or coupled to another component, other components may exist between the components. On the contrary, when a component is referred to as being "directly connected" or "directly coupled" to another component, it should be understood that no other component exists therebetween.

Hereinafter, preferred embodiments according to the present invention will be described in detail with reference to the accompanying drawings, and the same or similar components are given the same reference numerals regardless of drawing symbols, and redundant description thereof will be omitted. In addition, when it is determined in describing the present invention that a detailed description of a related known technology may obscure the gist of the present invention, the detailed description will be omitted. In addition, it should be noted that the accompanying drawings are only for easy understanding of the spirit of the present invention, and it should not be construed as limiting the spirit of the present invention by the accompanying drawings. The spirit of the present invention should be interpreted as extending to all changes, equivalents, and substitutes, in addition to the accompanying drawings.

Meanwhile, semantic segmentation is an important perception technique that allows automatic driving vehicles to recognize a wide range of a surrounding environment by dividing the environment for each object. In particular, 3D semantic segmentation allows the surrounding environment to be perceived three-dimensionally like in reality.

Recently, techniques for identifying objects included in point cloud data acquired from LiDAR have been developed on the basis of remarkable development in computer vision techniques and deep learning techniques.

However, due to the nature of sparsity of the point cloud data acquired from the LiDAR, i.e., no data exists between points, there is a problem in that it is difficult to accurately distinguish boundaries between the objects when the distance is too short or larger than a predetermined distance.

In addition, since the point cloud data does not include color information, there is a problem in that elements such as colors of traffic lights, markings on signboards, and the like that should be essentially recognized while driving cannot be recognized.

To overcome these limitations, the present invention proposes various means that can perform 3D semantic segmentation on the basis of fusion data including 3D information obtained through sensor fusion of cameras and LiDAR.

FIG. 1 is a configuration view showing an artificial intelligence learning system according to an embodiment of the present invention.

As shown in FIG. 1, the artificial intelligence learning system according to an embodiment of the present invention may be configured to include a learning data collection device 100, a learning data generation device 200, and an artificial intelligence learning device 300.

Since the components of the artificial intelligence learning system according to an embodiment like this are only functionally distinguished components, two or more components may be implemented to be integrated in an actual physical environment, or one component may be implemented to be separated in an actual physical environment.

Describing each component, the learning data generation device 100 is a device that collects data in real time from LiDAR and cameras installed on a vehicle to collect data for machine learning of artificial intelligence (AI) that can be used in automatic driving. However, it is not limited thereto, and the learning data collection device 100 may include radars and ultrasonic sensors. In addition, sensors, which are control targets of the learning data collection device 100 and installed on a vehicle to acquire, photograph, or detect data for machine learning, are not limited to one for each type, and a plurality of sensors may be provided although the sensors are of the same type.

The type of sensors, which are control targets of the learning data collection device 100 and installed on a vehicle to acquire, photograph, or detect data for machine learning, will be described below in further detail with reference to FIG. 2.

As a next component, the learning data generation device 200 may receive data collected in real time by a plurality of learning data collection devices 100 from the learning data collection devices 100 through mobile communication, and perform annotation on the received data.

The learning data generation device 200 may preemptively construct big data that may generate artificial intelligence (AI) learning data before a request for the artificial intelligence (AI) learning data is received from the artificial intelligence learning device 300.

Characteristically, the learning data generation device 200 may receive an image photographed by a camera and point cloud data acquired from LiDAR, and generate a projection image expressing the point cloud data in polar coordinates of a size the same as those of the image. In addition, the learning data generation device 200 may estimate a 2D segment map and a 3D segment map having dimensions as high as the number of types of classes to be predicted by inputting the image and the projection image into an artificial intelligence (AI) machine-learned in advance.

The learning data generation device 200 having these characteristics may transmit and receive data to and from the learning data collection device 100 and the artificial intelligence learning device 300, and any device that can perform operation based on the transmitted and received data may be permitted.

For example, the learning data generation device 200 may be any one of fixed-type computing devices such as a desktop computer, a workstation, and a server, but it is not limited thereto.

Meanwhile, detailed description of the learning data generation device 200 will be provided below with reference to FIGS. 3 and 4.

As a next component, the artificial intelligence learning device 300 is a device that can be used to develop artificial intelligence (AI).

Specifically, the artificial intelligence learning device 300 may transmit a request value including requirements that the artificial intelligence (AI) learning data should meet in order for the artificial intelligence (AI) to achieve the objects of development to the learning data generation device 200. The artificial intelligence learning device 300 may receive artificial intelligence (AI) learning data from the learning data generation device 200. In addition, the artificial intelligence learning device 300 may machine-learn the artificial intelligence (AI) to be developed using the received artificial intelligence (AI) learning data.

The artificial intelligence learning device 300 like this may be any device that can transmit and receive data to and from the learning data generation device 200 and perform operation using the transmitted and received data. For example, the artificial intelligence learning device 300 may be any one of fixed-type computing devices such as a desktop computer, a workstation, and a server, but it is not limited thereto.

One or more learning data collection devices 100, learning data generation devices 200, and artificial intelligence learning devices 300 as described above may transmit and receive data using a network that combines one or more among a security circuit directly connected between the devices, a public wired communication network, and a mobile communication network.

For example, the public wired communication network may include Ethernet, x Digital Subscriber Line (xDSL), Hybrid Fiber Coax (HFC), and Fiber-To-The-Home (FTTH), but is not limited thereto. In addition, the mobile communication network may include Code Division Multiple Access (CDMA), Wideband CDMA (WCDMA), High Speed Packet Access (HSPA), Long Term Evolution (LTE), and 5th generation mobile telecommunication, but is not limited thereto.

Figure 2:
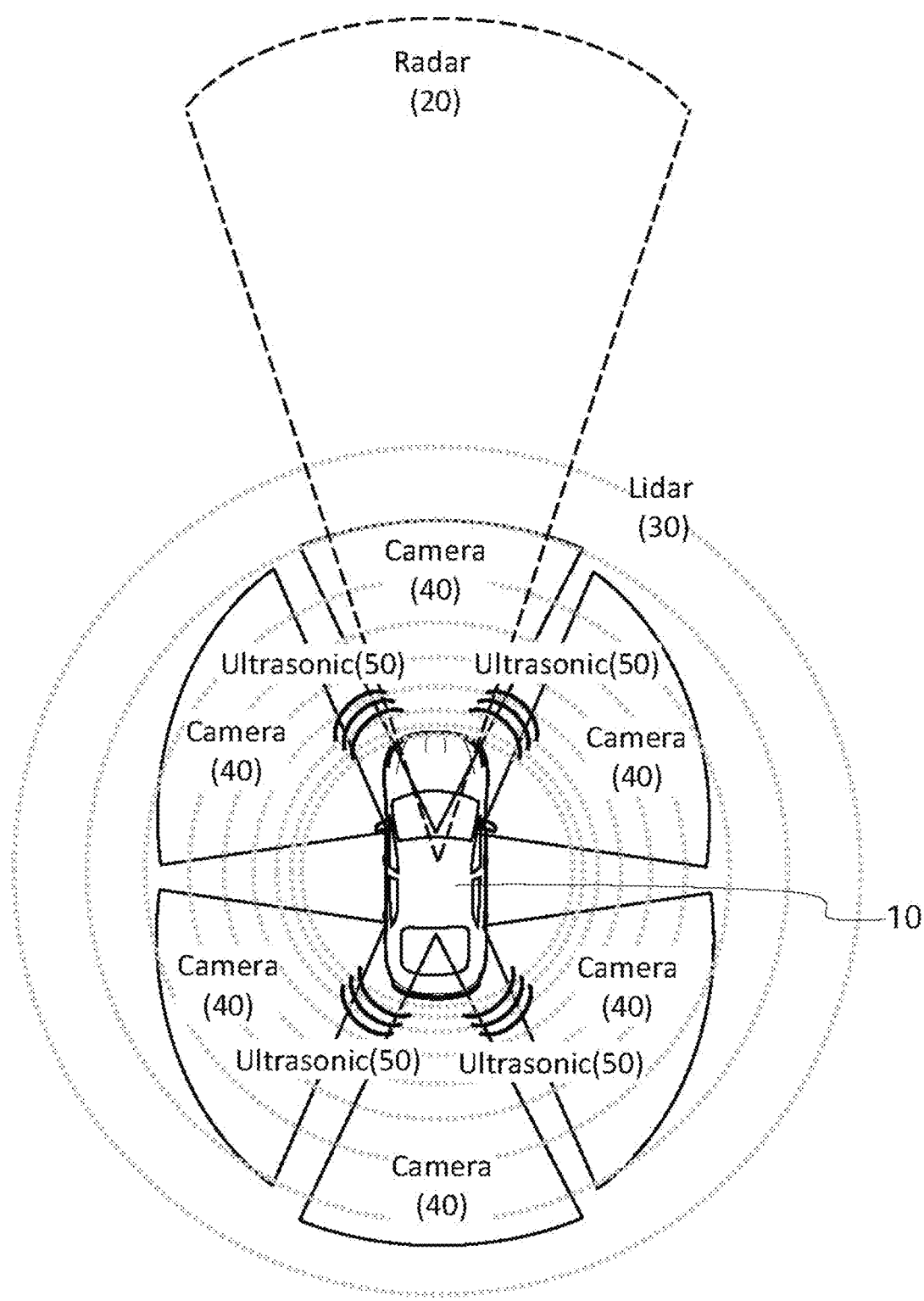
FIG. 2 is an exemplary view explaining the configuration of a learning data collection device according to an embodiment of the present invention.

FIG. 2 is an exemplary view explaining sensors according to an embodiment of the present invention.

As shown in FIG. 2, the learning data collection device 100 according to an embodiment of the present invention may control one or more among a radar 20, a LiDAR 30, cameras 40, and ultrasonic sensors 50 to collect basic data for machine learning of artificial intelligence (AI).

Here, the vehicle 10 is a vehicle having a radar 20, a LiDAR 30, cameras 40, and ultrasonic sensors 50 installed thereon to collect basic data for machine learning of artificial intelligence (AI), and may be distinguished from vehicles that perform automatic driving by artificial intelligence (AI).

The radar 20 is fixedly installed on the vehicle 10 to emit electromagnetic waves in the driving direction of the vehicle 10 and detect the electromagnetic waves reflected and returned by an object located in front of the vehicle 10, so that the vehicle 10 may generate sensing data corresponding to an image of the front side.

In other words, the sensing data is information on the points that reflect the electromagnetic waves emitted in the driving direction of the vehicle by the radar 20 fixedly installed on the vehicle 10. Accordingly, coordinates of a point included in the sensing data may have values corresponding to the location and shape of an object located in front of the vehicle 10. The sensing data like this may be 2D information, but it is not limited thereto and may also be 3D information.

The LiDAR 30 is fixedly installed on the vehicle 10 to radiate laser pulses around the vehicle 10 and detect light reflected and returned by objects located around the vehicle 10, so that 3D point cloud data corresponding to 3D images of the surroundings of the vehicle 10 can be generated.

In other words, 3D point cloud data is 3D information on the points that reflect laser pulses radiated around the vehicle by the LiDAR 30 fixedly installed on the vehicle 10. Accordingly, coordinates of the points included in the 3D point cloud data may have values corresponding to the locations and shapes of the objects located around the vehicle 10.

The camera 40 is fixedly installed on the vehicle 10 to capture 2D images of surroundings of the vehicle 10. A plurality of cameras 40 may be installed to be parallel to the ground surface or to be spaced apart from each other in the horizontal direction to photograph different directions. For example, FIG. 2 shows an example of a vehicle 10 in which six cameras 40 capable of photographing six different directions are fixedly installed, but it will be apparent to those skilled in the art that the cameras 40 that can be installed on the vehicle 10 may be configured in various numbers.

In other words, a 2D image is an image photographed by the camera 40 fixedly installed on the vehicle 10. Accordingly, the 2D image may include color information of objects located in the direction that the camera 40 faces.

The ultrasonic sensor 50 is fixedly installed on the vehicle 50, and may emit ultrasonic waves around the vehicle 10 and detect the ultrasonic waves reflected and returned by an object located to be adjacent to the vehicle 10 to generate distance information corresponding to the distance between the ultrasonic sensor 50 installed on the vehicle 10 and the object. Generally, a plurality of ultrasonic sensors 50 is configured to be fixedly installed on the front side, rear side, front-lateral side, and rear-lateral side of the vehicle 10 to be in contact with objects easily.

In other words, the distance information is information on the distance from an object detected by the ultrasonic sensor 50 fixedly installed on the vehicle 10.

Hereinafter, the configuration of the learning data generation device 200 as described above will be described in more detail.

Figure 3:
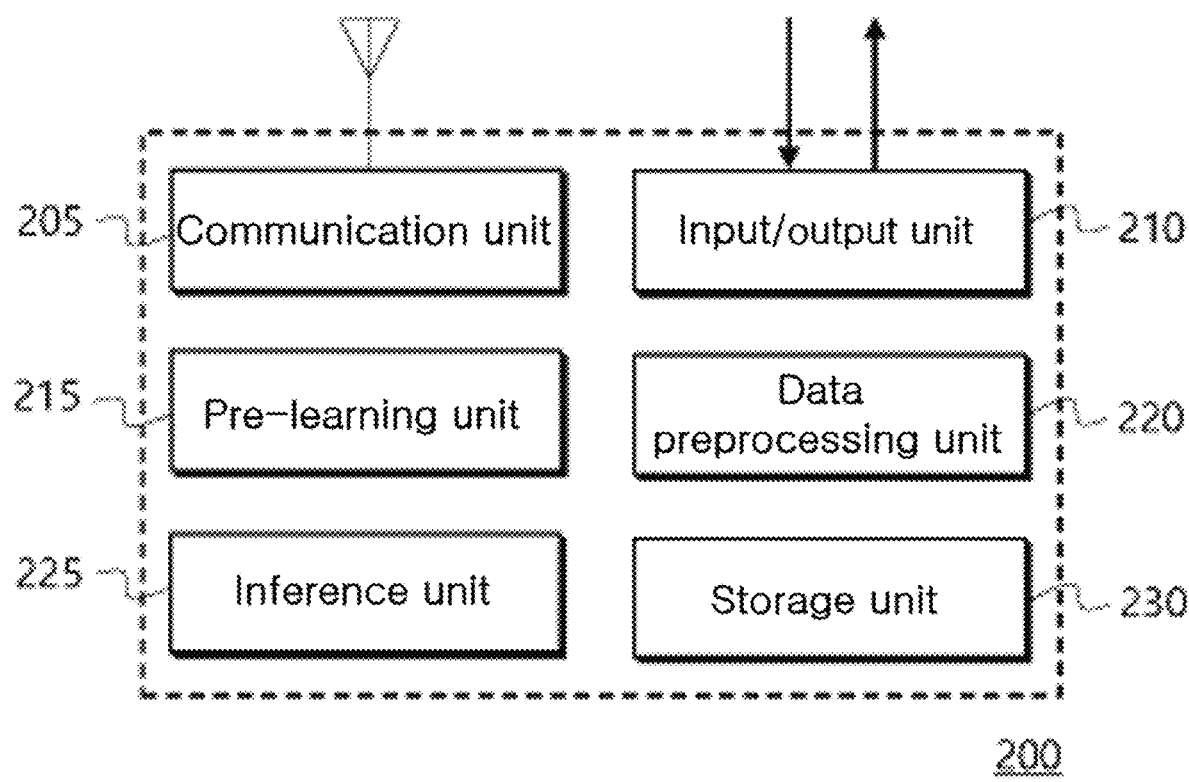
FIG. 3 is a logical configuration view showing a learning data generation device according to an embodiment of the present invention.

FIG. 3 is a logical configuration view showing a learning data generation device according to an embodiment of the present invention.

Referring to FIG. 3, the learning data generation device 200 may be configured to include a communication unit 205, an input/output unit 210, a pre-learning unit 215, a data preprocessing unit 220, an inference unit 225, and a storage unit 230.

Since components of the learning data generation device 200 like this are only functionally distinguished components, two or more components may be implemented to be integrated in an actual physical environment, or one component may be implemented to be separated in an actual physical environment.

Specifically, the communication unit 205 may receive images and point cloud data for machine learning of artificial intelligence (AI) from the learning data collection device 100.

In addition, the communication unit 205 may transmit a 3D analysis result of semantic segmentation to the artificial intelligence learning device 300.

As a next component, the input/output unit 210 may receive signals from a user through a user interface (UI) or output an operated result to the outside.

Specifically, the input/output unit 210 may receive various setting values for generating a semantic segmentation feature map or three-dimensionally interpreting a generated semantic segmentation feature map from a user, and output generated result values.

As a next component, the pre-learning unit 215 may previously learn the artificial intelligence on the basis of point cloud data acquired from the LiDAR included in a previously stored data set, images photographed through the camera at the same time as the point cloud data, calibration information between the LiDAR and the camera, and correct answer data in which class labels are specified in units of 3D points of the point cloud data.

Specifically, the pre-learning unit 215 may learn the artificial intelligence on the basis of a synthesis loss function that simultaneously calculates and sums loss values for estimating a 2D segment map and a 3D segment map.

Here, the synthesis loss function may be expressed as shown in the following equation.

$$L_{total} = L_{3D}(pred_{3D}, label_{3D}) + L_{2D}(pred_{2D}, label_{2D}) \quad \text{[Equation]}$$

(Here, $L_{2D}$ denotes a first loss value for estimating a 2D segment map, $L_{3D}$ denotes a second loss value for estimating a 3D segment map, $label_{2D}$ denotes a first correct answer value for estimating a 2D segment map, and $label_{3D}$ denotes a second correct answer value for estimating a 3D segment map.)

That is, the pre-learning unit 215 may use a synthesis loss function that simultaneously calculates a first loss value for 2D semantic segmentation and a second loss value for 3D semantic segmentation.

Meanwhile, the first correct answer value and the second correct answer value used to calculate each loss value are sparse data in which a good many of the data are emptied in black. Here, the reason why the first correct answer value and the second correct answer value are sparse data is that the correct answer values are generated in a method of assigning a 3D correct value of the point cloud data to 2D projective points projected through a multiplication operation with a calibration matrix.

Accordingly, the pre-learning unit 215 may set pixels neighboring as much as a preset distance from each point included in the first correct answer value with the same label to reduce the effect of sparsity characteristics. At this point, the pre-learning unit 215 may set neighboring pixels with the same label through nearest neighbor interpolation.

Meanwhile, the first loss value and the second loss value may be calculated through the following equation. That is, the first loss value and the second loss value may be calculated by adding Focal Loss, which minimizes the classification error of each segment between predicted 2D and 3D segment maps and first and second correct answer values corresponding thereto, and Dice Loss and Lovasz Loss, which minimize the structural error by optimizing the Intersection over Union (IoU) of segments targeting the entire map, respectively.

$$L_{2D} = L_{Focal}(pred_{2D}, \text{label}_{2D}) + L_{Dice}(pred_{2D}, \text{label}_{2D}) \quad \text{[Equation]}$$

$$L_{3D} = L_{Focal}(pred_{3D}, \text{label}_{3D}) + L_{Lovasz}(pred_{3D}, \text{label}_{3D})$$

(Here, $\text{label}_{2D}$ denotes the first correct answer value, and $\text{label}_{3D}$ denotes the second correct answer value.)

Focal Loss ($L_{Focal}$) may be calculated through the following equation. That is, when the model accurately predicts a correct answer, the pre-learning unit 215 may reduce the learning proportion by reducing the loss value to be smaller than the original value. On the contrary, when the model fails to predict a correct answer, the pre-learning unit 215 may induce the model to focus on the content that it does not properly learn during the learning process by increasing the loss value to be larger than the original value to increase the proportion of learning.

$$L_{Focal} = -P_{true} * (1 - P_{pred})^2 \log(P_{pred}) \quad \text{[Equaton]}$$

Dice Loss ($L_{Dice}$) may be calculated through the following equation. That is, the pre-learning unit 215 may learn the model to increase the similarity between the correct answer and the prediction, and apply label-smoothing to prevent biased learning of the model, which may occur due to data imbalance between the classes.

$$L_{Dice} = 1 - \frac{2\sum(P_{true} * P_{pred})}{\sum P_{true}^2 + \sum P_{pred}^2 + \epsilon} \quad \text{[Equation]}$$

Lovasz Loss ($L_{Lovasz}$) may be calculated through the following equation. That is, the pre-learning unit 215 may learn the model to make structurally optimized predictions across the entire map by measuring the structural error of the entire segment map around the IoU between the correct answer and the prediction, and imposing a strong penalty on the predictions that impede the IoU. In addition, the pre-learning unit 215 may train the model so that the model may accurately predict the structures of segments of each class by calculating the IoU for each class c for the entire class C configuring the learning data set, and calculating a loss value in a method of sorting the predictions and imposing a strong penalty to the prediction that reduces the IoU most.

$$L_{Lovasz} = \frac{1}{|C|} \sum_{c \in C} \overline{\Delta_{Jc}}(m(c)) \quad \text{[Equation]}$$

Here, $\Delta_{jc}$ may be calculated through the following equation.

$$\Delta_{j_c}(P_{true}, P_{pred}) = 1 - J_c(P_{true}, P_{label})$$

In addition, $J_c(P_{true}, P_{pred})$ may be calculated through the following equation.

$$J_c(P_{true}, P_{pred}) = \frac{|P_{true} = c \cap P_{pred} = c|}{|P_{true} = c \cup P_{pred} = c|}$$

In addition, $m_i(c)$ may be calculated through the following equation.

$$m_i(c) = \begin{cases} 1 - f_i(c) & \text{if } c = y_i^* \\ f_i(c) & \text{otherwise} \end{cases}$$

In addition, $f_i(c)$ may be calculated through the following equation.

$$f_i(c) = \frac{c^{F_i(c)}}{\sum_{c' \in C} c^{F_i(c)}(c')} \forall i \in [1, p], \forall_c \in C$$

(Here, $P_{pred}$ denotes the 2D segment map or the 3D segment map, $P_{true}$ denotes the first correct value or the second correct value, and C denotes the entire class, and c denotes each class.)

As a next component, the data preprocessing unit 220 may preprocess the point cloud data and the image received from the learning data collection device 100.

Specifically, the data preprocessing unit 220 may receive an image captured by the camera and point cloud data acquired from the LiDAR, and generate a projection image expressing the point cloud data in polar coordinates of a size the same as those of the image.

At this point, the data preprocessing unit 220 generates the projection image through a multiplication operation of the calibration matrix information between the LiDAR and the camera and coordinates of the point cloud data, and may generate an image and a projection image having the same height and width by truncating a preset area from the generated projection image, and equally truncating the truncated area from the image.

That is, the data preprocessing unit 220 may prevent unnecessary increase in the sparsity of data by truncating the sky part that cannot be measured using the LiDAR.

As a next component, the inference unit 225 may estimate a 2D segment map and a 3D segment map having dimensions as high as the number of types of classes to be predicted by inputting the image and the projection image into an artificial intelligence (AI) machine-learned in advance.

Specifically, the inference unit 225 may fuse the features extracted by the blocks of the encoder and the decoder on the basis of a unique fusion module designed based on an attention mechanism, and predict a 2D segment map of a (H, W) size and a 3D segment map of a (H*W) length having dimensions as high as the number of types of classes to be predicted through sensor fusion at the feature stage.

The inference unit 225 like this may be configured to include an encoder including a contextual block and a residual block (res block) for learning the structure and context information of the image and the projection image; a decoder including a dilation block (up block) for dilating the data output from the encoder, and an output layer for outputting a 2D segment map and a 3D segment map; and an attention fusion module including an attention fusion block for fusing feature maps output from the contextual block, the residual block, and the dilation block.

Here, the encoder may sequentially generate feature maps of ½, ¼, ⅛, and 1/16 times of the size of the image and the projection image, and transfer the feature maps to the dilation block of the decoder.

The decoder may sequentially restore the received feature maps in sizes of ⅛, ¼, ½, and 1. At this point, the dilation block may include a pixel shuffle layer for dilating or reducing the received feature maps, a dilated convolution layer for learning features of dilated feature maps, and a concatenation layer for concatenating the dilated feature maps with the feature map transferred from the residual block of the encoder through a residual connection (skip connection).

The attention fusion block may be arranged between a plurality of residual blocks and a plurality of dilation blocks, excluding the contextual block, to infer features of the projection image having a relatively insufficient amount of information about the shapes, structures, and boundaries of objects on the basis of features of an image having color information.

In this way, the inference unit 220 may generate a 2D segment map and a 3D segment map with emphasized important features by inferring locations and reflection rates of the important features from the feature maps of the image through artificial intelligence, multiplying the inferred locations and reflection rates with the feature map of the image and the feature map of the projection image, and connecting the feature maps to the image and the projection image through the residual block.

At this point, the inference unit 225 may derive a channel including important features among the channels of the generated 3D segment map, calculate importance of the derived channel, and connect the channel through a residual path.

Meanwhile, further detailed description of the inference unit 225 will be provided below with reference to the drawings.

As a next component, the storage unit 230 may store data needed for operation of the learning data generation device 200. The storage unit 235 may store data needed to design data for artificial intelligence (AI) learning.

Hereinafter, hardware for implementing logical components of the learning data generation device 200 as described above will be described in more detail.

Figure 4:
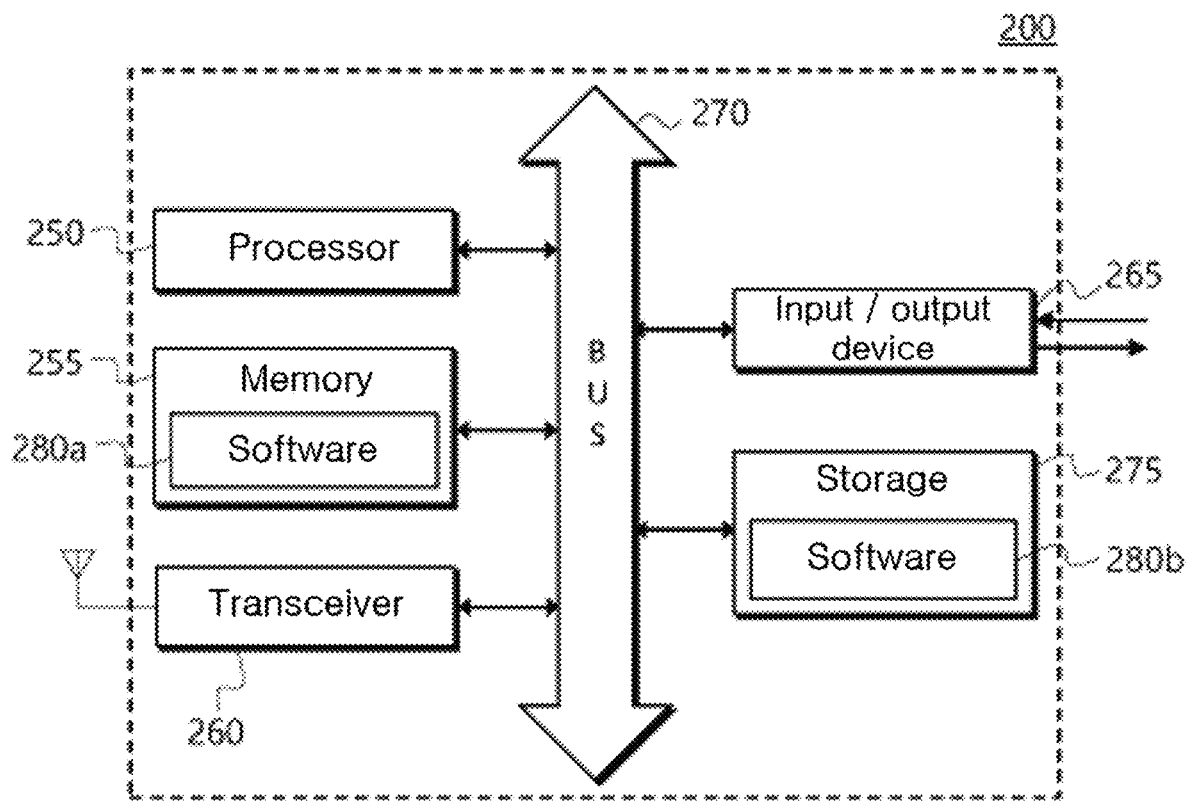
FIG. 4 is a hardware configuration view showing a learning data generation device according to an embodiment of the present invention.

FIG. 4 is a hardware configuration view showing a learning data generation device according to an embodiment of the present invention.

Referring to FIG. 4, the learning data generation device 200 may be configured to include a processor 250, a memory 255, a transceiver 260, an input/output device 265, a data bus 270, and a storage 275.

The processor 250 may implement the operation and functions of the learning data generation device 200 on the basis of instructions according to the software 280a loaded on the memory 255. The software 280a implementing the method according to the present invention may be loaded on the memory 255. The transceiver 260 may transmit and receive data to and from the learning data collection device 100 and the artificial intelligence learning device 300.

The input/output device 265 may receive data needed for operation of the learning data design device 200 and output a generated result value. The data bus 270 is connected to the processor 250, the memory 255, the transceiver 260, the input/output device 265, and the storage 275 to perform a function of a passage for transferring data between the components.

The storage 275 may store application programming interfaces (API), library files, resource files, and the like needed for execution of the software 280a implementing the method according to the present invention. The storage 275 may store software 280b implementing the method according to the present invention. In addition, the storage 275 may store information needed for performing the 3D semantic segmentation method. Particularly, the storage 275 may include a database 285 that stores programs for performing the 3D semantic segmentation method.

According to an embodiment of the present invention, the software 280a and 280b loaded on the memory 255 or stored in the storage 275 may be a computer program recorded on a recording medium to execute the steps of: receiving an image photographed by a camera and point cloud data acquired from LiDAR, by the processor 250; generating a projection image expressing the point cloud data in polar coordinates of a size the same as those of the image, by the processor 250; and estimating a 2D segment map and a 3D segment map having dimensions as high as the number of types of classes to be predicted by inputting the image and the projection image into an artificial intelligence (AI) machine-learned in advance, by the processor 250.

More specifically, the processor 250 may include an Application-Specific Integrated Circuit (ASIC), another chipset, a logic circuit, and/or a data processing device. The memory 255 may include read-only memory (ROM), random access memory (RAM), flash memory, a memory card, a storage medium, and/or other storage devices. The transceiver 260 may include a baseband circuit for processing wired/wireless signals. The input/output device 265 may include an input device such as a keyboard, a mouse, and/or a joystick, an image output device such as a Liquid Crystal Display (LCD), an Organic LED (OLED), and/or an active matrix OLED (AMOLED), and a printing device such as a printer, a plotter, or the like.

When the embodiments included in this specification are implemented as software, the method described above may be implemented as a module (process, function, or the like) that performs the functions described above. The module may be loaded on the memory 255 and executed by the processor 250. The memory 255 may be inside or outside the processor 250 and connected to the processor 250 by various well-known means.

Each component shown in FIG. 4 may be implemented by various means, for example, hardware, firmware, software, or a combination thereof. When a component is implemented as hardware, an embodiment of the present invention may be implemented as one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, and the like.

In addition, when the component is implemented as firmware or software, an embodiment of the present invention may be implemented in the form of a module, procedure, function, or the like that performs the functions or operations described above, and recorded on a recording medium that can be read through various computer means. Here, the recording medium may include program commands, data files, data structures, and the like individually or in combination. Program instructions recorded on a recording medium may be instructions specially designed and configured for the present invention or those known to and used by those skilled in computer software. For example, the recording medium includes magnetic media such as hard disks, floppy disks, and magnetic tapes, optical media such as Compact Disk Read Only Memory (CD-ROMs) and Digital Video Disks (DVDs), magneto-optical media such as floptical disks, and hardware devices specially configured to store and execute program instructions, such as ROM, RAM, flash memory, and the like. Examples of the program instructions may include high-level language codes that can be executed by a computer using an interpreter or the like, as well as machine language codes generated by a compiler. These hardware devices may be configured to operate as one or more pieces of software to perform the operations of the present invention, and vice versa.

Figure 5:
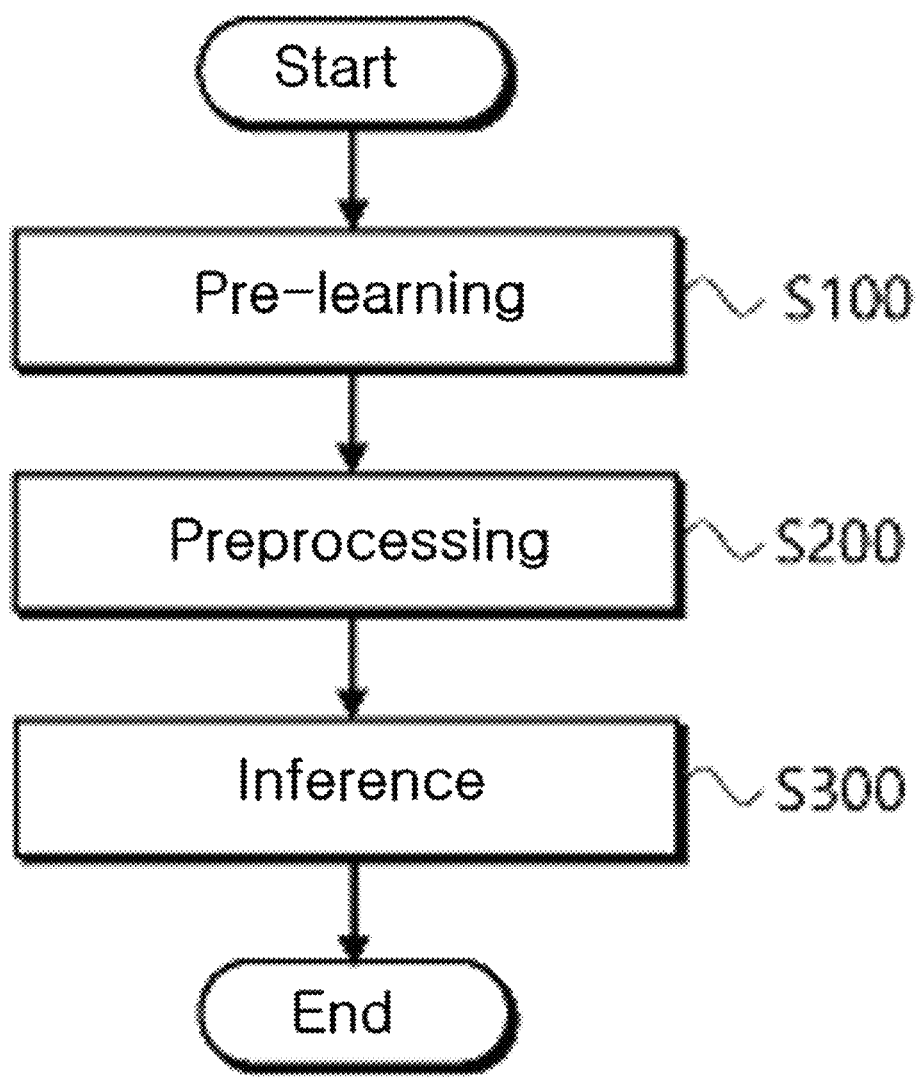
FIG. 5 is a flowchart illustrating a 3D semantic segmentation method according to an embodiment of the present invention.
Figure 6:
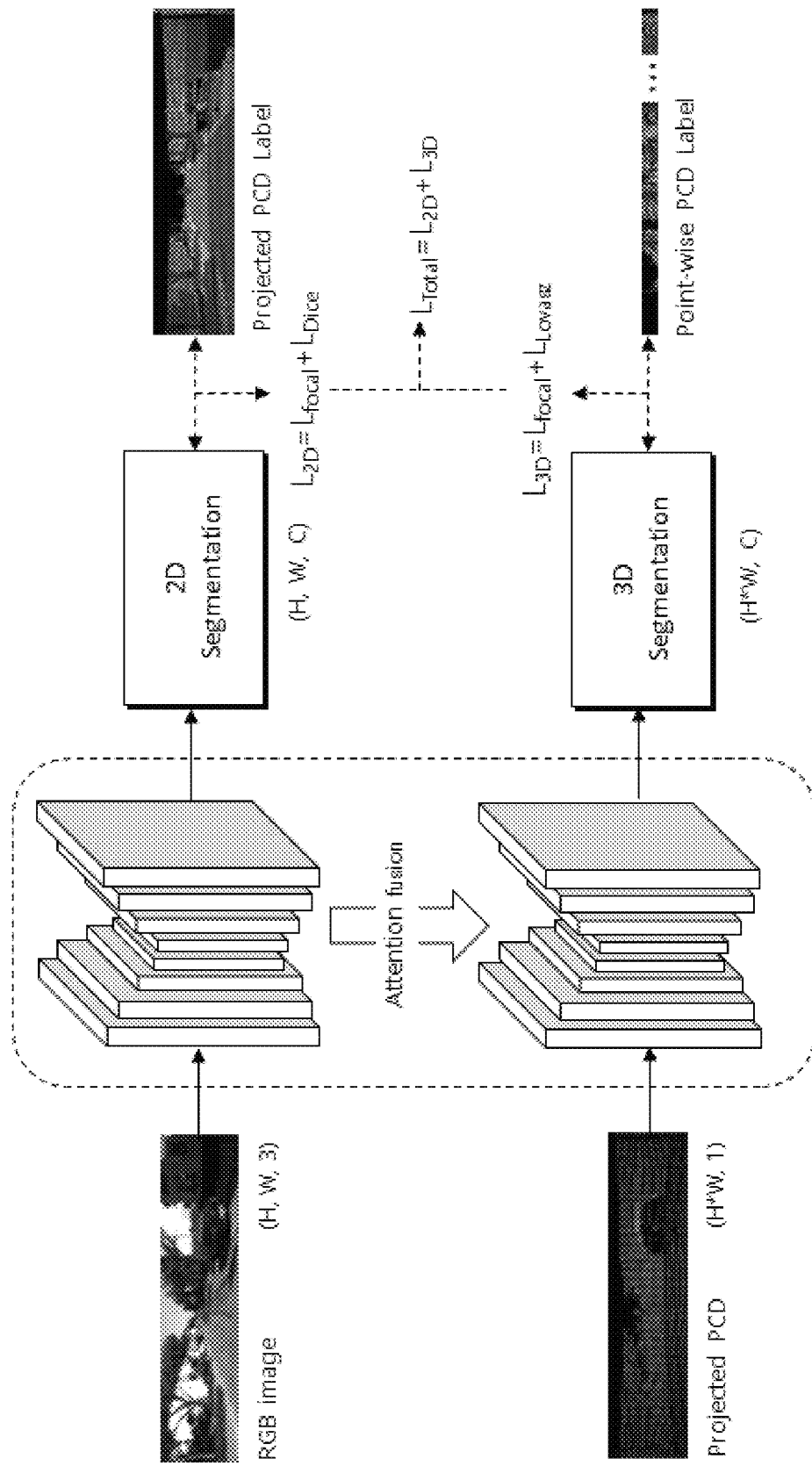
FIG. 6 is a view illustrating the sequence of a 3D semantic segmentation method according to an embodiment of the present invention.

FIG. 5 is a flowchart illustrating a 3D semantic segmentation method according to an embodiment of the present invention, and FIG. 6 is a view illustrating the sequence of a 3D semantic segmentation method according to an embodiment of the present invention.

Referring to FIGS. 5 and 6, first, at step S100, the learning data generation device may previously train the artificial intelligence on the basis of point cloud data acquired from the LiDAR included in a previously stored data set, images photographed through the camera at the same time as the point cloud data, calibration information between the LiDAR and the camera, and correct answer data in which class labels are specified in units of 3D points of the point cloud data.

Specifically, the learning data generation device may learn the artificial intelligence on the basis of a synthesis loss function that simultaneously calculates and sums loss values for estimating a 2D segment map and a 3D segment map.

Here, the synthesis loss function may be expressed as shown in the following equation.

$$L_{total} = L_{3D}(pred_{3D}, label_{3D}) + L_{2D}(pred_{2D}, label_{2D}) \quad \text{[Equation]}$$

(Here, $L_{2D}$ denotes a first loss value for estimating a 2D segment map, $L_{3D}$ denotes a second loss value for estimating a 3D segment map, $label_{2D}$ denotes a first correct answer value for estimating a 2D segment map, and $label_{3D}$ denotes a second correct answer value for estimating a 3D segment map.)

That is, the learning data generation unit may use a synthesis loss function that simultaneously calculates a first loss value for 2D semantic segmentation and a second loss value for 3D semantic segmentation.

Meanwhile, the first correct answer value and the second correct answer value used to calculate each loss value are sparse data in which a good many of the data are emptied in black. Here, the reason why the first correct answer value and the second correct answer value are sparse data is that the correct answer values are generated in a method of assigning a 3D correct value of the point cloud data to 2D projective points projected through a multiplication operation with a calibration matrix.

Accordingly, the learning data generation unit may set pixels neighboring as much as a preset distance from each point included in the first correct answer value with the same label to reduce the effect of sparsity characteristics. At this point, the learning data generation unit may set neighboring pixels with the same label through nearest neighbor interpolation.

Meanwhile, the first loss value and the second loss value may be calculated through the following equation. That is, the first loss value and the second loss value may be calculated by adding Focal Loss, which minimizes the classification error of each segment between predicted 2D and 3D segment maps and first and second correct answer values corresponding thereto, and Dice Loss and Lovasz Loss, which minimize the structural error by optimizing the Intersection over Union (IoU) of segments targeting the entire map, respectively.

$$L_{2D} = L_{Focal}(pred_{2D}, label_{2D}) + L_{Dice}(pred_{2D}, label_{2D}) \quad \text{[Equation]}$$

$$L_{3D} = L_{Focal}(pred_{3D}, label_{3D}) + L_{Lovasz}(pred_{3D}, label_{3D})$$

(Here, $label_{2D}$ denotes the first correct answer value, and $label_{3D}$ denotes the second correct answer value.)

Focal Loss ($L_{Focal}$) may be calculated through the following equation. That is, when the model accurately predicts a correct answer, the learning data generation unit may reduce the learning proportion by reducing the loss value to be smaller than the original value. On the contrary, when the model fails to predict a correct answer, the learning data generation unit may induce the model to focus on the content that it does not properly learn during the learning process by increasing the loss value to be larger than the original value to increase the proportion of learning.

$$L_{Focal} = -P_{true} * (1 - P_{pred})^2 \log(P_{pred}) \quad \text{[Equation]}$$

Dice Loss ($L_{Dice}$) may be calculated through the following equation. That is, the learning data generation unit may learn the model to increase the similarity between the correct answer and the prediction, and apply label-smoothing to prevent biased learning of the model, which may occur due to data imbalance between the classes.

$$L_{Dice} = 1 - \frac{2\sum(P_{true} * P_{pred})}{\sum P_{true}^2 + \sum P_{pred}^2 + \epsilon} \quad \text{[Equation]}$$

Lovasz Loss ($L_{Lovasz}$) may be calculated through the following equation. That is, the learning data generation unit may learn the model to make structurally optimized predictions across the entire map by measuring the structural error of the entire segment map around the IoU between the correct answer and the prediction, and imposing a strong penalty on the predictions that impede the IoU. In addition, the learning data generation unit may train the model so that the model may accurately predict the structures of segments of each class by calculating the IoU for each class c for the entire class C configuring the learning data set, and calculating a loss value in a method of sorting the predictions and imposing a strong penalty to the prediction that reduces the IoU most.

$$L_{Lovasz} = \frac{1}{|C|} \sum_{c \in C} \overline{\Delta_{Jc}}(m(c))$$ [Equation]

Here, $\Delta_{jc}$ may be calculated through the following equation.

$$\Delta_{j_c}(P_{true}, P_{pred}) = 1 - J(P_{true}, P_{label})$$

In addition, $J_c(P_{true}, P_{pred})$ may be calculated through the following equation.

$$J_c(P_{true}, P_{pred}) = \frac{|P_{true} = c \cap P_{pred} = c|}{|P_{true} = c \cup P_{pred} = c|}$$

In addition, $m_i(c)$ may be calculated through the following equation.

$$m_i(c) = \begin{cases} 1 - f_i(c) & \text{if } c = y_i^* \\ f_i(c) & \text{otherwise} \end{cases}$$

In addition, $f_i(c)$ may be calculated through the following equation.

$$f_i(c) = \frac{c^{F_i(c)}}{\sum_{c' \in C} c^{F_i(c)}(c')} \forall i \in [1, p], \forall_c \in C$$

(Here, $P_{pred}$ denotes the 2D segment map or the 3D segment map, $P_{true}$ denotes the first correct value or the second correct value, and C denotes the entire class, and c denotes each class.)

Next, at step S220, the learning data generation device may preprocess the point cloud data and the image.

Specifically, the learning data generation device may receive an image captured by the camera and point cloud data acquired from the LiDAR, and generate a projection image expressing the point cloud data in polar coordinates of a size the same as those of the image.

At this point, the learning data generation device generates the projection image through a multiplication operation of the calibration matrix information between the LiDAR and the camera and coordinates of the point cloud data, and may generate an image and a projection image having the same height and width by truncating a preset area from the generated projection image, and equally truncating the truncated area from the image.

Then, at step S300, the learning data generation device may estimate a 2D segment map and a 3D segment map having dimensions as high as the number of types of classes to be predicted by inputting the image and the projection image into an artificial intelligence (AI) machine-learned in advance.

Specifically, the learning data generation device may fuse the features extracted by the blocks of the encoder and the decoder on the basis of a unique fusion module designed based on an attention mechanism, and predict a 2D segment map of a (H, W) size and a 3D segment map of a (H*W) length having dimensions as high as the number of types of classes to be predicted through sensor fusion at the feature stage.

Specifically, the learning data generation device may generate a 2D segment map and a 3D segment map with emphasized important features by inferring locations and reflection rates of the important features from the feature maps of the image through artificial intelligence, multiplying the inferred locations and reflection rates with the feature map of the image and the feature map of the projection image, and connecting the feature maps to the image and the projection image through the residual block.

Figure 7:
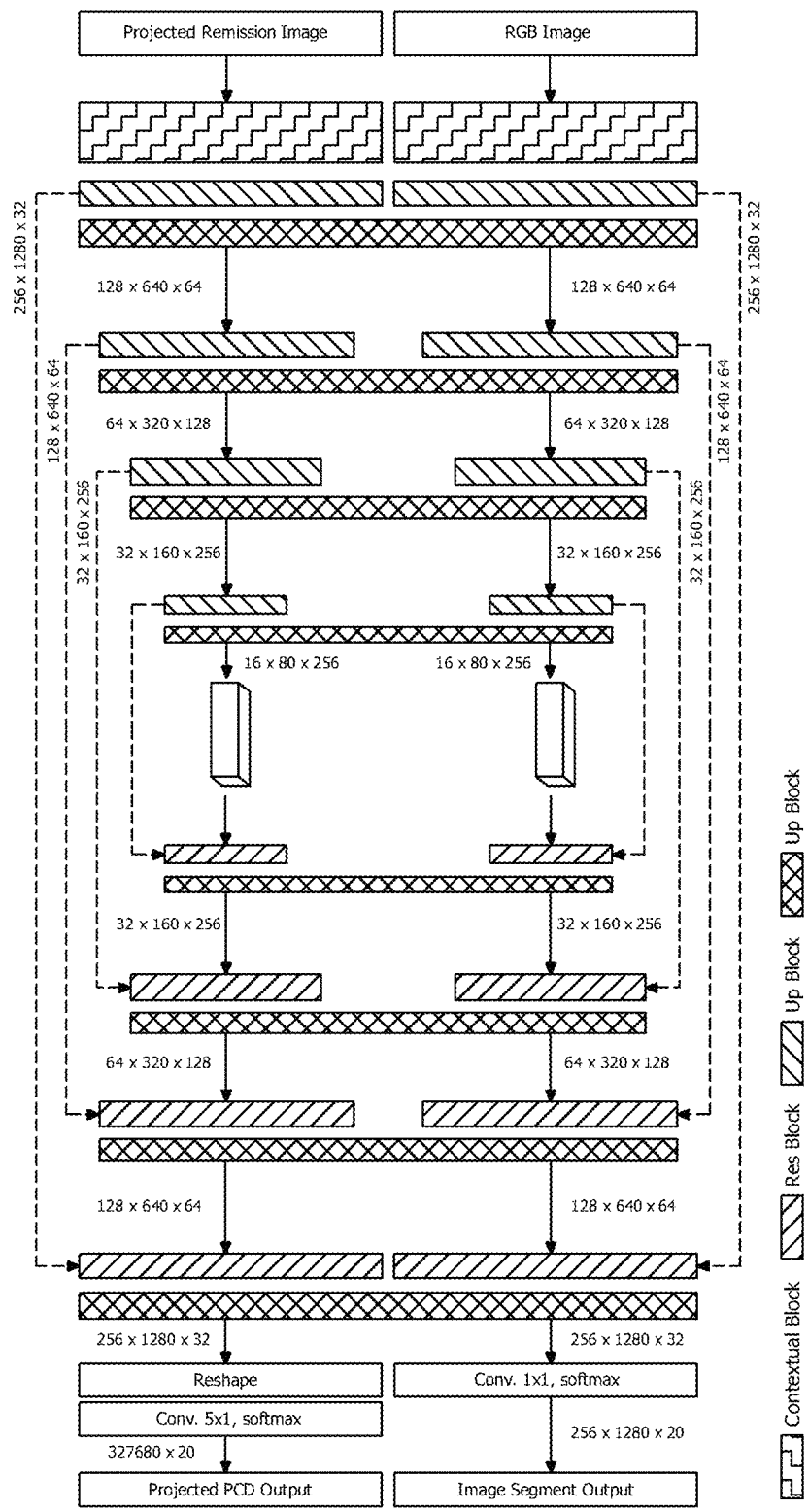
FIGS. 7 to 9 are exemplary views illustrating a 3D semantic segmentation method according to an embodiment of the present invention.
Figure 8:
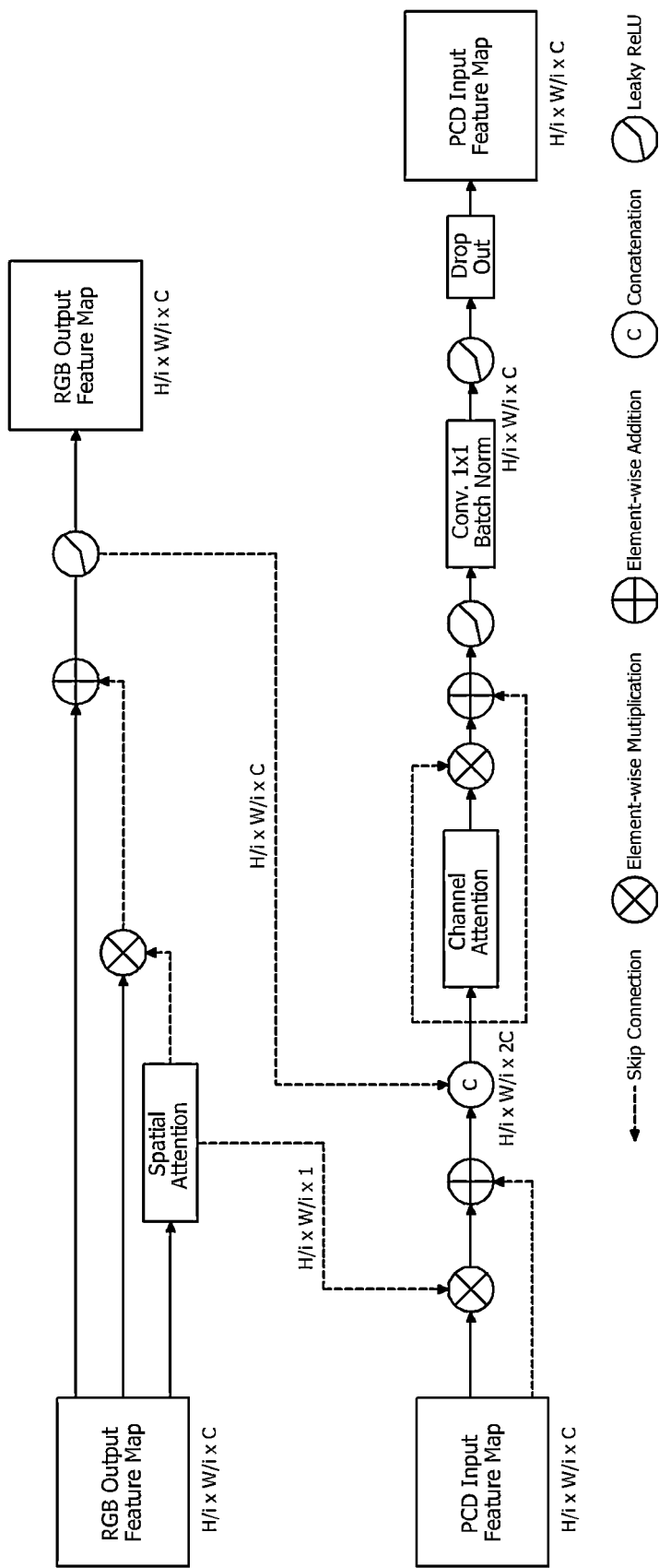
Figure 9:
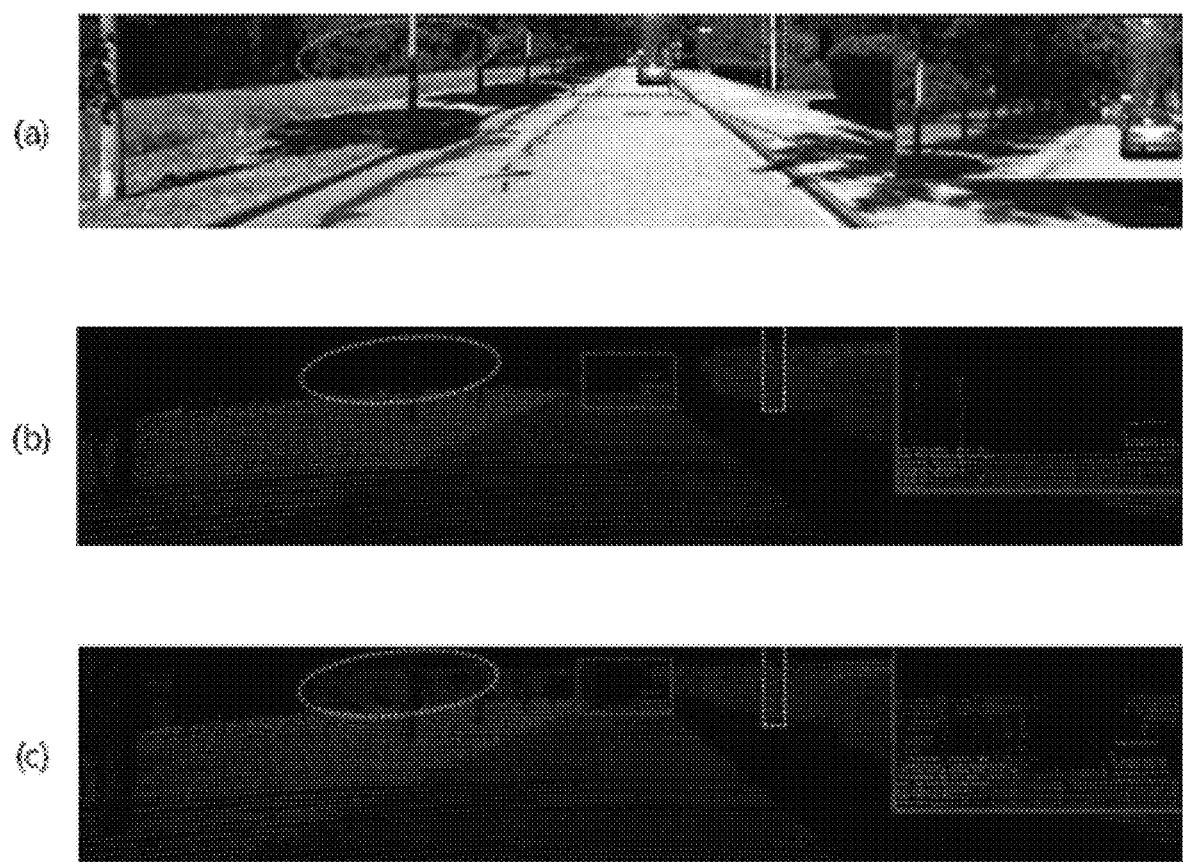

FIGS. 7 to 9 are exemplary views illustrating a 3D semantic segmentation method according to an embodiment of the present invention.

First, as shown in FIG. 7, the artificial intelligence model according to the 3D semantic segmentation method according to an embodiment of the present invention has a neural network for images and a neural network for projection images symmetrical to each other. Each neural network includes an encoder configured of three contextual blocks and four residual blocks for learning the structure and context information of input data, and a decoder configured of four dilation blocks and an output layer for outputting a 2D segment map and a 3D segment map. In addition, the artificial intelligence model is configured of eight attention fusion blocks for fusing the feature maps output from the blocks.

First, describing the residual block of the encoder in detail, the convolution layer in the residual block uses dilated convolution that can accommodate features of a wider range only with parameters as many as those of general convolution. At this point, the size of the accommodation area may be set diversely so that spatial information of multiple scales ranging from a narrow area to a large area may be extracted as features. A feature map including the features extracted in this way is transferred to the decoder through a path called a residual connection (skip connection), and at the same time, the horizontal and vertical lengths are reduced to ½ of the input of each block through a pooling layer located at the end of each residual block.

The feature map of the image and the feature map of the projection image reduced in this way are transferred to the input of the designed attention fusion module as shown in FIG. 8.

Here, the attention fusion module may be located between all blocks constituting the encoder and the decoder, and perform a process of inferring features of the projection image, which are ambiguous in expression of the shapes, structures, and boundaries of the objects and have a relatively insufficient amount of information, on the basis of features of images having high-density color information, and complementing the features by fusing them.

Accordingly, the artificial intelligence model generates two feature maps with emphasized features of important locations by finding first the locations and reflection rates of important features from the feature map of an RGB image through a spatial attention module, multiplying the locations and reflection rates with the feature map of the projection image and the feature map of the image, and connecting the feature maps to the original feature maps through a residual path.

Unlike the output path of the image feature map, which activates and outputs the feature map with emphasized features of important locations as is, the feature map of the projection image with an insufficient amount of information on data further goes through a process of extracting important features by a channel attention module before outputting the feature map. Accordingly, the feature map of the projection image with emphasized features of important locations is concatenated to the output feature map of a previously extracted image and transferred to the channel attention module.

The channel attention module may generate a feature map emphasizing the channels that include important features, as well as the locations where the important features exist, by going through a process of obtaining channels that include the important features and their importance among the channels configuring the input feature map, multiplying the channels and their importance with the input of the channel attention module, and connecting them through the residual path.

Finally, as the feature map is compressed and fused using a convolution layer that uses a 1×1 kernel and a batch normalization layer, an output feature map of the projection image, which is created based on the important features existing in the two feature maps input into the attention fusion module, is generated.

Through repetition of the residual block and the fusion attention block, the encoder sequentially generates feature maps of ½, ¼, and ⅛ times of the input size of the neural network, and finally extracts a feature map of 1/16 times of the input and transfers the feature map to the input of the dilation block configuring the decoder.

The dilation block of the decoder may include a pixel shuffle layer that dilates the size of the feature map four times and reduces the channel by ¼ on the basis of the features in the feature map provided as an input. In addition, the dilation block is configured of a dilation convolution layer for learning the features of the dilated feature map once again, and a concatenation layer for concatenating the dilated feature map with the feature map transferred from the residual block of the encoder through a residual connection.

In this way, the decoder performs a process of sequentially restoring the feature map received as an input in sizes of ⅛, ¼, ½, and 1 compared to the input.

Finally, the feature map of the image and the feature map of the projection image restored to the original size are transferred to the output layer to generate inference results for 2D and 3D spaces, respectively.

First, the output layer of the image forms an inference map of a (H, W, C) shape using a convolutional layer that uses a 1×1 kernel and the Softmax activation function.

Meanwhile, the output layer of the projection image reconfigures the feature map into two dimensions of H×W length. Thereafter, the output layer forms an inference map of (H×W, C) using a convolutional layer that uses a 5×1 kernel and the Softmax activation function to predict one point considering the sparsity characteristics of the point cloud data by taking into account even the features calculated in the surrounding areas.

The inference results generated in this way are used when the synthesis loss function calculates a loss value, when an evaluation function calculates an evaluation value at an evaluation step, and when an application needs a result of 3D semantic segmentation of point cloud data at a utilization step.

Hereinafter, data set "semanticKITTI" used in the experiment and evaluation of the semantic segmentation method according to an embodiment of the present invention and detailed implementation of preprocessing processes for applying the data set will be described, and results of ablation experiments and performance comparison performed in the process of designing the 3D semantic segmentation method according to an embodiment of the present invention will be described.

"SemanticKITTI" is a public data set widely used in the field of 3D semantic segmentation researches for automatic driving and is characterized by including both RGB images photographing the front area of a vehicle and point cloud data on the entire 360° area. Therefore, sequences 0 to 10 (19,130 cases, excluding sequence 8) provided by the "SemanticKITTI" for training purpose is randomly divided at a ratio of 8:2 to be used for training and validation of the 3D semantic segmentation method according to an embodiment of the present invention, and sequence number 8 (4,071 cases) provided by the "SemanticKITTI" for verification purpose is used for evaluation (test).

However, since the 3D semantic segmentation method according to an embodiment of the present invention requires a projection image generated by selecting data in the front area the same as the RGB image among the 360° point cloud and projecting the data into the same coordinate system as the RGB image, a projective transformation is performed to convert (x, y, z) coordinates of 3D point cloud into (u, v) coordinates of a 2D camera using a calibration matrix between the RGB camera and the LiDAR as shown in the equation below.

$$\begin{pmatrix} u \\ v \\ 1 \end{pmatrix} = \begin{pmatrix} f_u & 0 & u_0 \\ 0 & f_v & v_0 \\ 0 & 0 & 1 \end{pmatrix} \begin{pmatrix} R & t \\ t & 1 \end{pmatrix} \begin{pmatrix} x \\ y \\ z \\ 1 \end{pmatrix} \quad \text{[Equation]}$$

(Here, $f_u$ and $f_v$ denote focal lengths of cameras, $u_0$ and $v_0$ denote internal camera parameters of optical type, and R and t denote the external parameters that mean relative rotation and parallel movement of the camera and LiDAR.)

In addition, since the size of the RGB image provided by "SemanticKITTI" varies in each sequence, the size is fixed to (H, W):(256, 1280) in the 3D semantic segmentation method according to an embodiment of the present invention. In addition, as a tool for evaluating performance of the 3D semantic segmentation method according to an embodiment of the present invention, a mean intersection over union (mIoU), which obtains a ratio of inference results matching the correct answers for each class and calculates an average thereof, is used. However, in order to prevent the sparsity characteristics of the point cloud data from adversely affecting the model learning and evaluation, all the inference results for the points that are not paired with correct answer data, i.e., the points other than those included in the correct answer, among the 2D and 3D inference results, are excluded from calculation of the loss value and evaluation value.

All the experiments are conducted in an environment of eight "A100 GPUS", and in the experiment process, a model of the 3D semantic segmentation method according to an embodiment of the present invention is implemented through the "PyTorch library tool". All optimization functions of the neural network use "Leaky ReLU", and the dropout ratio for the dropout layer is set to 0.2 to minimize overfitting of the neural network, which may occur in the learning process.

Learning of the neural network is carried out through the Adam optimizer, the learning rate begins from 0.0001 and exponentially decreases at a decay rate (Gamma) of 0.99 using an Exponential LR scheduler, and it is set to ignore the maximum learning epoch value, which is set to proceed for 500 epochs, and terminate the learning early when the verification loss value is recorded to be higher than the lowest loss value recorded during the learning for 15 consecutive epochs.

In the following description, ablation experiments, which are performed to determine details of the neural network according to the 3D semantic segmentation method according to an embodiment of the present invention, and results thereof are described.

Meanwhile, Table 1 below shows the results of ablation experiments on single/dual output and fusion methods.

TABLE 1

| | Backbone | Fusion | 2D mIoU | 3D mIoU |
|---|---|---|---|---|
| [7] | ResNeSt with MSM | Middle-2 stage | 36.9 | 24.8 |
| Ablation Trial 1 | ResNeSt with MSM | All stage | 50.5 | 48.1 |

Referring to Table 1, in the first experiment, it is attempted to observe changes in the performance according to the difference in the output structure by comparing a neural network of a single output structure, which generates an output using a single decoder by fusing an encoder using an image as an input and an encoder using a projection image as an input into one body at the feature stage, with a neural network of a dual output structure, which uses a different decoder for each encoder.

As a method of fusing features at this point, a method of simply concatenating feature maps output from the block as shown in [7] is used in both cases, and fusion of the features is performed on the output of the second block in the encoder in [7] and on the output of all blocks of the encoder and the decoder in the dual output structure.

As a result of the experiment, as shown in Table 1, the neural network of a dual output structure that uses a separate decoder for each encoder shows performance of about 13% higher in the case of 2D and about 24% higher in the case of 3D on the basis of mIoU, compared to [7] that does not use a dual output structure. This means, as shown in the result, that although fusion features are configured using sensor fusion, as each data has unique characteristics different from each other, separate decoders, which may learn specialized unique characteristics, may produce relatively better results compared to a single decoder.

Meanwhile, Table 2 below shows the results of ablation experiments on the effects of the attention block.

TABLE 2

| | Backbone | Fusion | AFB | 2D mIoU | 3D mIoU |
|---|---|---|---|---|---|
| Ablation Trial 1 | ResNeSt with MSM | All stage | | 50.5 | 48.1 |
| Ablation Trial 2 | ResNeSt with MSM | All stage | ✓ | 50.9 | 51.1 |

Referring to Table 2, as a second ablation experiment, an experiment is conducted by changing the method of fusing features of a neural network of a dual input and output structure of the previous experiment from simple concatenation to an attention fusion module based on channel and spatial attention, to grasp the effect of selecting features of important types from important locations centered on visual information during the fusion, and configuring fusion features focusing on the features.

As shown in Table 2 as a result of the experiment, although feature stage fusion is performed on all blocks in both cases, the result of performing feature stage fusion by applying the attention fusion module shows performance of 0.4% higher in the case of 2D and 3% higher in the case of 3D on the basis of mIoU, compared to the result of performing feature stage fusion through simple concatenation. This means that fusion features configured by selecting important features at important locations among the features extracted by the neural network may strengthen the expressiveness for 3D semantic segmentation of features of point cloud projection images.

On the other hand, Table 3 below shows the results of ablation experiments for "ResNeSt" and "SalsaNext" including MSM.

TABLE 3

| | Backbone | Fusion | AFB | 2D mIoU | 3D mIoU |
|---|---|---|---|---|---|
| Ablation Trial 1 | ResNeSt with MSM | All stage | ✓ | 50.9 | 51.1 |
| TwinAMFNet (Ours) | SalsaNext | All stage | ✓ | 60.9 | 68.4 |

Referring to Table 3, as a third and final ablation experiment, an experiment of comparing by changing the blocks in the encoder and the decoder configuring the neural network from the blocks in [7] to the blocks of "SalsaNext" that show a good result in 2D semantic segmentation is conducted using the advantages of projection-based 3D semantic segmentation that allows free implantation of traditional 2D semantic segmentation techniques.

The blocks of the two neural networks are common in that they are configured around a convolutional module or layer designed to extract multi-scale features except the contextual block of "SalsaNext" and have the advantage of easily applying the attention fusion module according to the present invention as a structure that generates feature maps with different resolutions in units of blocks configuring the encoder and the decoder.

As shown in Table 3 as a result of the experiment, compared to the case of using existing blocks, the case of applying the blocks of "SalsaNext" to a neural network shows performance of about 10% higher in the case of 2D and 17% higher in the case of 3D on the basis of mIoU. This means that combination of the blocks of "SalsaNext" and the attention fusion module of the 3D semantic segmentation method according to an embodiment of the present invention may show better effects in extracting features effective for 3D semantic segmentation.

Hereinafter, for quantitative comparison of the neural network according to a 3D semantic segmentation method according to an embodiment of the present invention with existing studies for 3D semantic segmentation purpose, visual considerations for evaluating qualitative performance of the 3D semantic segmentation method according to an embodiment of the present invention will be described while performing performance evaluation and comparison on the basis of mIoU.

Meanwhile, Table 4 shows the results of performance evaluation and comparison with existing studies of the 3D semantic segmentation method according to an embodiment of the present invention in the "SemanticKITTI" verification data set.

TABLE 4

| | Num_Input | Num_Output | Fusion | 2D mIoU | 3D mIoU |
|---|---|---|---|---|---|
| [7] (Ours) | 2 | 1 | Middle-fusion In E | 36.9 | 24.8 |
| PointPainting | 1 | 1 | Early fusion | — | 54.5 |
| RGBAL | 2 | 1 | Middle-fusion In E | — | 56.2 |
| PMF | 2 | 2 | Middle-fusion In E | — | 63.9 |
| TwinAMF Net (Ours) | 2 | 2 | Middle-fusion In E + D | 60.9 | 68.4 |

Referring to Table 4, "TwinAMFNet", which is a 3D semantic segmentation method according to an embodiment of the present invention, has recorded performance of 60.9% in the case of 2D and 68.4% in the case of 3D on the basis of mIoU. This is an improvement of about 4.5% on the basis of 3D mIoU compared to "PMF", which has the same dual input/output structure as the 3D semantic segmentation method according to an embodiment of the present invention, and when the scale of the feature map is restored to the original scale by the decoder in the neural network of the encoder-decoder structure, the decoder of the 3D semantic segmentation method according to an embodiment of the present invention may make more accurate inferences since it may utilize useful information extracted from each sensor through sensor fusion modules, unlike the "PMF".

In addition, it can be seen that the 3D semantic segmentation method according to an embodiment of the present invention definitely shows superior performance compared to the methods having other input-output structures, and records performance about 43.6% higher than [7] having a dual input-single output structure, about 12.2% higher than "RGBAL" having the same input-output structure, and about 13.9% higher than "PointPainting" having a single input-output structure.

This means that the 3D semantic segmentation method according to an embodiment of the present invention may learn the model that can infer segments more accurately than other methods owing to the quantitative and qualitative differences of the features extracted according to the location of sensor fusion (difference in the absolute information amount of a loss value calculated according to single input/output and the number of outputs through early fusion of "PointPainting" (single output structures of [7] and "RGBAL")).

In addition, in addition to the performance evaluation of the 3D semantic segmentation method according to an embodiment of the present invention through quantitative numerical comparison with previous studies, the result of inferring the verification data of "SemanticKITTI" using the 3D semantic segmentation method according to an embodiment of the present invention is visualized as shown in FIG. 9 and compared to the correct answer data and the image, in order to qualitatively evaluate its performance. Here, (a) is a sample image taken from the "SemanticKITTI" validation data set, (b) is the correct answer data for the projection image of the sample, and (c) is an image visualized by reconstructing the result of 3D semantic segmentation, performed on the sample using the 3D semantic segmentation method according to an embodiment of the present invention, into a 2D image.

As shown in FIG. 9, the 3D semantic segmentation method according to an embodiment of the present invention may find plants, pillars, tree trunks, something to ride, and the like in the distant, which do not exist even in the correct answer of the projection image, and it can be seen that this is an accurate result compared to the RGB image.

Describing in further detail, it can be seen that the area marked with a blue dotted circle is a forest when viewed in the RGB image, but there is no data existing in the correct answer for the projection image. In this way, improving accuracy of finely detecting nearby objects in the surrounding area may be an important factor in determining whether a sudden appearance of an object is dangerous in automatic driving. For example, when an object like a small ball appears, of which the movement cannot be predicted, this may lead to a fatal accident through contact with a driving vehicle, so that accurate detection of an object at a close distance has a great advantage in preventing accidents. Meanwhile, a good detection of objects in the distance is also an important factor in reducing the risk of accidents in automatic driving.

As shown in FIG. 9, although it can be seen that there are wooden pillars and a bicycle in the RGB image in the case of an area marked with a dotted red square, which is an example located at a distance, there is no data existing in the correct answer for the projection image.

This means that also the 3D semantic segmentation model learned based on the data does not recognize the objects in that part. For example, when it is assumed that the shooting speed of the image is 30 FPS, it takes about 50 frames, i.e., about 1.5 seconds, for the vehicle to reach the location of the person riding the bicycle in the red dotted box of the image. This means that it should be able to detect within 1.5 seconds and respond to an unexpected situation that may occur with an object unrecognized as the distance between the automatic driving vehicle and the object is long, and it means that when an automatic driving vehicle is driving at a high speed, the risk naturally increases as the time is further reduced.

Accordingly, securing an ability of recognizing a distant object from outside a sufficient safe stopping distance to prepare for an unexpected situation as shown in (c) as a result of the 3D semantic segmentation method according to an embodiment of the present invention is important to prevent vehicle and human accidents of automatic driving vehicles.

Accordingly, the results of the 3D semantic segmentation method according to an embodiment of the present invention capable of object detection further dilated through sensor fusion of cameras and LiDAR may sufficiently contribute to improving the driving safety of automatic driving vehicles.

In summary, the 3D semantic segmentation method according to an embodiment of the present invention may improve performance of 3D semantic segmentation by fusing the color, shape, and boundary information of the objects that a 2D image has and the distance and space information that the 3D point cloud data has using the attention fusion module.

In addition, a result of improving performance is confirmed through the comparative experiment described above. In addition, through qualitative analysis of resulting images, it can be confirmed that the inference result of the 3D semantic segmentation method according to an embodiment of the present invention shows high expressiveness for areas at a distance and small objects at a close distance, and compared to the RGB image, the inference is actually more accurate than the correct answer data of the 3D point cloud provided by the data set.

As described above, although preferred embodiments of the present invention have been disclosed in the specification and drawings, it is apparent to those skilled in the art that other modified examples based on the technical spirit of the present invention can be implemented in addition to the embodiments disclosed herein. In addition, although specific terms are used in the specification and drawings, they are only used in a general sense to easily explain the technical contents of the present invention and help understanding of the present invention, and are not intended to limit the scope of the present invention. Accordingly, the detailed description described above should not be interpreted as limiting in all respects and should be interpreted illustrative. The scope of the present invention should be selected by reasonable interpretation of the appended claims, and all changes within the equivalent scope of the present invention are included in the scope of the present invention.

DESCRIPTION OF SYMBOLS

| | | | |
|---|---|---|---|
| 100: | Learning data collection device | 200: | Learning data generation device |
| 300: | Artificial intelligence learning device | | |
| 205: | Communication unit | 210: | Input/output unit |
| 215: | Pre-learning unit | 220: | Data preprocessing unit |
| 225: | Inference unit | 230: | Storage unit |

What is claimed is:

1. A 3D semantic segmentation method comprising steps of:
   receiving an image photographed by a camera and point cloud data acquired from a LiDAR sensor;
   generating, by a learning data generation device, a projection image expressing the point cloud data in polar coordinates of a size equal to those of the image, wherein the generating step includes generating the projection image through a multiplication operation of calibration matrix information between the LiDAR sensor and the camera and coordinates of the point cloud data, and generating an image and the projection image having a same height and width by truncating a preset area from the projection image and by equally truncating the image;
   inputting the image and the projection image into an artificial intelligence (AI) machine, learned in advance to estimate a 2D segment map and a 3D segment map having dimensions as high as a number of types of classes to be predicted; and
   learning artificial intelligence before the 2D segment map and the 3D segment map are estimated based on a synthesis loss function that simultaneously calculates and sums loss values for estimating the 2D segment map and the 3D segment map,
   wherein the synthesis loss function is expressed as shown in a following equation:

$$L_{total} = L_{3D}(pred_{3D}, label_{3D}) + L_{2D}(pred_{2D}, label_{2D})$$

here, $L_{2D}$ denotes a first loss value for estimating the 2D segment map, $L_{3D}$ denotes a second loss value for estimating the 3D segment map, $pred_{2D}$ denotes a predicted answer for estimating the 2D segment map, $pred_{3D}$ denotes a predicted answer for estimating the 3D segment map, $label_{2D}$ denotes a first correct answer value for estimating the 2D segment map, and $label_{3D}$ denotes a second correct answer value for estimating the 3D segment map,
   wherein the learning step includes a step of setting pixels neighboring as much as a preset distance from each point included in the first correct answer value with a same label,
   wherein the first correct answer value and the second correct answer value used to calculate each of the loss values are sparse data as the first correct answer value and the second correct answer value are generated in a method of assigning a 3D correct value of the point cloud data to 2D projective points projected through the multiplication operation of calibration matrix information,
   wherein the artificial intelligence (AI) machine includes a neural network for images and a neural network for projection images symmetrical to each other, and wherein each of the neural network for images and the neural network for projection images includes:
   an encoder including three contextual blocks and four residual blocks (res blocks) for learning a structure and context information of the image and the projection image;
   a decoder including four dilation blocks (up blocks) for dilating data output from the encoder, and an output layer for outputting the 2D segment map and the 3D segment map; and
   an attention fusion module including eight attention fusion blocks for fusing feature maps output from the three contextual blocks, the four residual blocks, and the four dilation blocks, and
   wherein the AI machine generates two feature maps with emphasized features of important locations by finding first locations and reflection rates of important features from a feature map of an image through a spatial attention module, multiplying the first locations and the reflection rates with a feature map of the projection image and the feature map of the image and connecting the feature map of the projection image and the feature map of the image to original feature maps through a residual path.

2. The method according to claim 1, wherein the first loss value and the second loss value are calculated through a following equation:

$$L_{2D} = L_{Focal}(pred_{2D}, label_{2D}) + L_{Dice}(pred_{2D}, label_{2D})$$

$$L_{3D} = L_{Focal}(pred_{3D}, label_{3D}) + L_{Lovasz}(pred_{3D}, label_{3D})$$

here, pred$_{2D}$ denotes a predicted answer for estimating the 2D segment map, pred$_{3D}$ denotes a predicted answer for estimating the 3D segment map, label$_{2D}$ denotes the first correct answer value, and label$_{3D}$ denotes the second correct answer value.

3. The method according to claim 1, wherein the encoder sequentially generates feature maps of ½, ¼, ⅛, and 1/16 times of the size of the image and the projection image, and transfers the feature maps to the four dilation blocks of the decoder, the decoder sequentially restores the feature maps received from the encoder in sizes of ⅛, ¼, ½, and 1, and the four dilation blocks include a pixel shuffle layer for dilating or reducing the feature maps received from the encoder, a dilated convolution layer for learning features of dilated feature maps, and a concatenation layer for concatenating the dilated feature maps with the feature maps transferred from the four residual blocks of the encoder through a residual connection.

4. The method according to claim 3, wherein the eight attention fusion blocks are arranged between a plurality of residual blocks and a plurality of dilation blocks, excluding the contextual block, to infer features of the projection image having an insufficient amount of information about shapes, structures, and boundaries of objects based on features of an image having color information.

5. A non-transitory computer-readable medium, comprising a set of instructions stored therein, that when executed by a processor, causes the processor to perform a 3D semantic segmentation method comprising:

receiving an image photographed by a camera and point cloud data acquired from a LiDAR sensor;

generating a projection image expressing the point cloud data in polar coordinates of a size equal to those of the image, wherein the generating step includes generating the projection image through a multiplication operation of calibration matrix information between the LiDAR sensor and the camera and coordinates of the point cloud data, and generating an image and the projection image having a same height and width by truncating a preset area from the projection image and by equally truncating the image;

inputting the image and the projection image into an artificial intelligence (AI) machine, learned in advance to estimate a 2D segment map and a 3D segment map, each having dimensions as high as a number of types of classes to be predicted; and learning artificial intelligence before the 2D segment map and the 3D segment map are estimated based on a synthesis loss function that simultaneously calculates and sums loss values for estimating the 2D segment map and the 3D segment map, wherein the synthesis loss function is expressed as shown in a following equation:

$$L_{total} = L_{3D}(pred_{3D}, label_{3D}) + L_{2D}(pred_{2D}, label_{2D})$$

here, L$_{2D}$ denotes a first loss value for estimating the 2D segment map, L$_{3D}$ denotes a second loss value for estimating the 3D segment map, pred$_{2D}$ denotes a predicted answer for estimating the 2D segment map, pred$_{3D}$ denotes a predicted answer for estimating the 3D segment map, label$_{2D}$ denotes a first correct answer value for estimating the 2D segment map, and label$_{3D}$ denotes a second correct answer value for estimating the 3D segment map, wherein the learning step includes a step of setting pixels neighboring as much as a preset distance from each point included in the first correct answer value with a same label, wherein the first correct answer value and the second correct answer value used to calculate each of the loss values are sparse data as the first correct answer value and the second correct answer value are generated in a method of assigning a 3D correct value of the point cloud data to 2D projective points projected through the multiplication operation of calibration matrix information, wherein the artificial intelligence (AI) machine includes a neural network for images and a neural network for projection images symmetrical to each other, and wherein each of the neural network for images and the neural network for projection images includes:

an encoder including three contextual blocks and four residual blocks (res blocks) for learning a structure and context information of the image and the projection image;

a decoder including four dilation blocks (up blocks) for dilating data output from the encoder, and an output layer for outputting the 2D segment map and the 3D segment map; and an attention fusion module including eight attention fusion blocks for fusing feature maps output from the three contextual blocks, the four residual blocks, and the four dilation blocks, and wherein the AI machine generates two feature maps with emphasized features of important locations by finding first locations and reflection rates of important features from a feature map of an image through a spatial attention module, multiplying the first locations and the reflection rates with a feature map of the projection image and the feature map of the image and connecting the feature map of the projection image and the feature map of the image to original feature maps through a residual path.

* * * * *